Feb. 19, 1929.

1,702,429

H. B. DONLEY

SIGNAL LAMP FOR MOTOR VEHICLES

Filed April 7, 1924

Inventor
Harold B. Donley

By C. C. Shepherd
Attorney

Patented Feb. 19, 1929.

1,702,429

UNITED STATES PATENT OFFICE.

HAROLD B. DONLEY, OF COLUMBUS, OHIO, ASSIGNOR TO THE JOHN W. BROWN MFG. CO., OF COLUMBUS, OHIO, A CORPORATION OF OHIO.

SIGNAL LAMP FOR MOTOR VEHICLES.

Application filed April 7, 1924. Serial No. 704,724.

The present invention is directed to improvements in signal lamps for motor vehicles.

The primary object of the invention is to provide a device of this character constructed in such manner as to serve as a combined stop and backing light, the illumination thereof being accomplished with a single incandescent bulb and a reflector.

A further object of the invention is to provide a signal of this character for use upon the rear of an automobile and having combined therewith a tail light which can be operated with or independently of the stop and backing lights.

With these and other objects in view, as will appear as the description proceeds, the invention consists in the novel features of construction, combinations of elements and arrangements of parts, and hereinafter to be fully described and pointed out in the appended claim.

Figure 1:
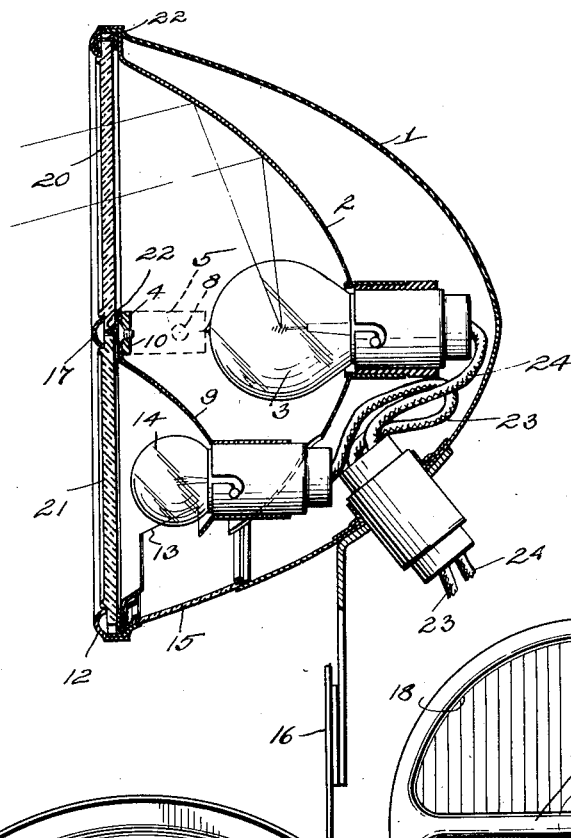
Figure 1 is a vertical sectional view through the device.
Figure 3:
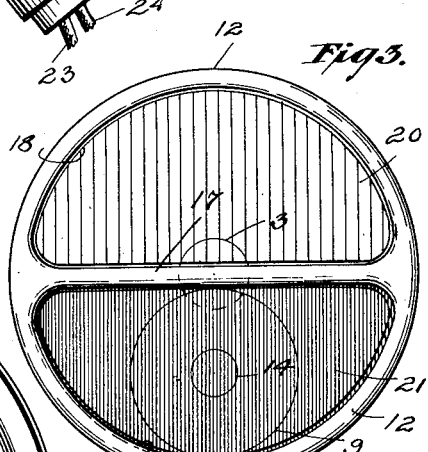
Figure 3 is a front view of the lenses and supporting ring therefor.
Figure 2:
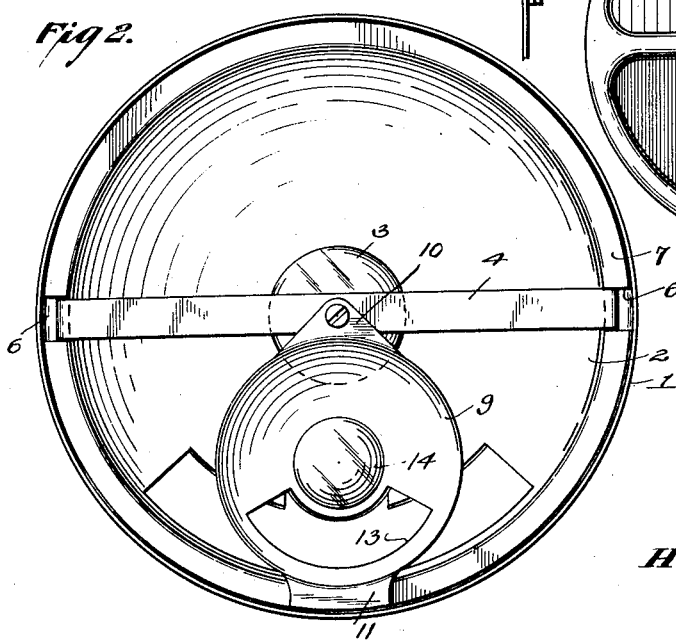
Figure 2 is a front view of the device with the lenses removed.

Referring to the drawing 1 designates the casing in which is mounted the reflector 2 and supported by said reflector is an incandescent bulb 3 capable of being adjusted backwardly and forwardly to regulate the focus thereof.

A horizontal bar 4 is employed and extends across the center of the open end of the reflector, said bar having rearwardly bent terminal arms 5 extended into the recesses 6 of the annular flange 7 of the reflector, said arms being disposed between the casing and reflector and are secured to the casing by bolts 8.

A relatively small reflector 9 is located in the lower end of the reflector 2 and is provided upon its upper edge with an ear 10 which is bolted to the center of the bar 4. The lower end of this reflector is provided with an ear 11 adapted to rest against the flange 7 and is held thereon by the lens ring 12, the said ring being secured to the casing 1 in any approved manner. The reflector 9 is provided with an opening 13 to permit the rays of light from the incandescent bulb 14 mounted therein to be reflected through the casing window 15 upon the license tag 16.

The ring 12 is formed with a centrally located horizontally disposed rib 17 which divides the ring into upper and lower semicircular openings 18 and 19, respectively. The openings are closed by lenses 20 and 21, respectively, said lenses being held in place by tongues 22 carried by the ring and rib.

The lenses 20 and 21 are colored respectively, white and red, and it will be observed that the lower or red lens 21 covers the reflector 9, whereby a tail light is provided.

As shown clearly in Figure 1 the bulb 3 is so focused that the light rays therefrom will be reflected downwardly through the lens 20 upon the roadway to enable the driver of the car to clearly see the roadway as the car is backed. It will be further observed that the light from the bulb 3 will also brightly illuminate those portions of the red lens 21 upon opposite sides of the reflector 9, whereby said lens will serve to give a stop indication. When the bulb 14 is illuminated for night use, the area of the lens 21 covering the reflector 7 will be illuminated as will be obvious, said bulb being furnished with current from the wire 23. Current is furnished to the bulb 3 through wires 24 which are connected with suitable switches (not shown) which are operated by the foot break lever and the shift lever when in position for reversing the travel of the car. Thus when the foot break lever is actuated the bulb 3 will be illuminated to illuminate the lens 21 thereby operating the stop signal. This bulb also is illuminated when the shift lever is in its reverse position so that the rays therefrom will be reflected by the reflector through the lens 20 to illuminate the roadway and enable the driver to back the car in safety. It will be of course understood that if desired the bulb 14 may be illuminated when the foot lever is actuated, it only being necessary to connect the wires 23 with the switch controlling the illumination of the bulb 3 when it is illuminated through the instrumentality of its cooperative switch.

What is claimed is:

A signal lamp of the class described, comprising a casing, a main reflector mounted in the casing, a bar in front of the main reflector and disposed horizontally of the casing and having its ends fixed thereto, a supplemental reflector of smaller diameter having its outer edge secured to the central portion of said bar and mounted in said main reflector in such a manner that the open sides of said reflectors lie in substantially the same plane, a lens ring, means removably engaging it with the casing and having a horizontally disposed rib carried thereby and covering said bar, said rib dividing the lens ring into upper and lower openings, and a lens positioned in each opening and illuminated by the rays issuing from the illuminating elements situated in the principal axis of each reflector.

In testimony whereof I affix my signature.

HAROLD B. DONLEY.